(12) United States Patent
Matsuki

(10) Patent No.: US 8,779,719 B2
(45) Date of Patent: Jul. 15, 2014

(54) CHARGING CONTROL APPARATUS

(75) Inventor: Tsutomu Matsuki, Miyoshi (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 177 days.

(21) Appl. No.: 13/141,454

(22) PCT Filed: Jul. 5, 2010

(86) PCT No.: PCT/JP2010/061395
§ 371 (c)(1),
(2), (4) Date: Jun. 22, 2011

(87) PCT Pub. No.: WO2012/004848
PCT Pub. Date: Jan. 12, 2012

(65) Prior Publication Data
US 2012/0091954 A1    Apr. 19, 2012

(51) Int. Cl.
*H02J 7/00* (2006.01)
*B60K 6/20* (2007.10)
(52) U.S. Cl.
USPC .................... 320/109; 180/65.21; 903/903
(58) Field of Classification Search
CPC ....................................................... Y02T 90/14
USPC ............................................... 320/109, 111
See application file for complete search history.

(56) References Cited

U.S. PATENT DOCUMENTS

| 2010/0033140 | A1 | 2/2010 | Otake |
| 2010/0213896 | A1 | 8/2010 | Ishii et al. |
| 2010/0295507 | A1* | 11/2010 | Ishii et al. ..................... 320/109 |

FOREIGN PATENT DOCUMENTS

| JP | A-1-107619 | 4/1989 |
| JP | A-7-33033 | 2/1995 |
| JP | A-9-149544 | 6/1997 |
| JP | A-10-38298 | 2/1998 |
| JP | A-11-66993 | 3/1999 |
| JP | A-2002-45975 | 2/2002 |
| JP | A-2002-153086 | 5/2002 |
| JP | A-2007-26741 | 2/2007 |
| JP | A-2007-305365 | 11/2007 |
| JP | A-2008-312380 | 12/2008 |
| JP | A-2009-71989 | 4/2009 |
| JP | A-2011-35975 | 2/2011 |

OTHER PUBLICATIONS

International Search Report issued in International Application No. PCT/JP2010/061395 dated Sep. 14, 2010.

* cited by examiner

*Primary Examiner* — Edward Tso
*Assistant Examiner* — Ahmed Omar
(74) *Attorney, Agent, or Firm* — Oliff PLC

(57) ABSTRACT

A charging control apparatus mounted on a vehicle connected to an external charging device through a charging connector, for performing control related to charging, includes a voltage sensor for detecting a voltage applied to the charging connector, and a control device for estimating, based on variation in voltage detected by the voltage sensor during a predetermined period of time after the charging connector is connected to the vehicle, variation in voltage applied to the charging connector after a lapse of the predetermined period of time, and determining that a failure has occurred in the external charging device if a degree of separation between the variation in voltage detected by the voltage sensor after the lapse of the predetermined period of time and the estimated variation in voltage is larger than a predetermined value.

10 Claims, 5 Drawing Sheets

CHARGING CONTROL APPARATUS

TECHNICAL FIELD

The present invention relates to a charging control apparatus, and more particularly to a charging control apparatus mounted on a vehicle connected to an external charging device through a charging connector, for performing control related to charging.

BACKGROUND ART

In recent years, an electric vehicle, a hybrid vehicle, a fuel cell vehicle and the like have been receiving attention as environmentally friendly vehicles. These vehicles incorporate a motor for generating a driving force for traveling, and a power storage device for storing electric power supplied to the motor. A hybrid vehicle further incorporates an internal combustion engine together with the motor as a mechanical power source, and a fuel cell vehicle incorporates a fuel cell as a direct current (DC) power supply for driving the vehicle.

Among these vehicles, a vehicle is known in which a vehicle-mounted power storage device for driving the vehicle can be charged by a power supply in an ordinary household. Electric power is supplied from the power supply in the ordinary household to the power storage device by connecting a power supply outlet provided in a house to a charging port provided on the vehicle through a charging cable, for example. It is noted that such vehicle in which the vehicle-mounted power storage device can be charged by the power supply outside of the vehicle will also be hereinafter referred to as "plug-in vehicle."

Japanese Patent Laying-Open No. 2009-71989 (Patent Document 1) discloses a technique about charging of such plug-in vehicle. This plug-in vehicle can conduct communication with a charging station and the like by using a pilot signal during charging, and detect a break in a control line for communicating the pilot signal.

PRIOR ART DOCUMENTS

Patent Documents

Patent Document 1: Japanese Patent Laying-Open No. 2009-71989
Patent Document 2: Japanese Patent Laying-Open No. 1-107619
Patent Document 3: Japanese Patent Laying-Open No. 7-33033
Patent Document 4: Japanese Patent Laying-Open No. 9-149544
Patent Document 5: Japanese Patent Laying-Open No. 10-38298
Patent Document 6: Japanese Patent Laying-Open No. 11-66993
Patent Document 7: Japanese Patent Laying-Open No. 2002-153086
Patent Document 8: Japanese Patent Laying-Open No. 2007-26741

SUMMARY OF THE INVENTION

Problems to be Solved by the Invention

In Japan, the standard for a plug-in vehicle is established in "Electric Vehicle Conductive Charging System: General Requirements" of the Japan Electric Vehicle Association Standard (JEVS). Japanese Patent Laying-Open No. 2009-71989 discussed above also employs the control pilot prescribed in "Electric Vehicle Conductive Charging System: General Requirements."

The control pilot is defined as a control line that connects a control circuit of EVSE (Electric Vehicle Supply Equipment) which supplies electric power from on-premises wiring to a vehicle to a grounded part of the vehicle through a control circuit on the vehicle side. A connection state of a charging cable, whether or not electric power is supplied from the power supply to the vehicle, a rated current of the EVSE and the like are determined based on a pilot signal communicated through this control line. Charging modes in which the control pilot is used (modes 2, 3) are described in "Electric Vehicle Conductive Charging System: General Requirements".

A charging mode in which the control pilot is not used (mode 1) is also described in "Electric Vehicle Conductive Charging System: General Requirements."

When an operator presses a start button provided on a charging station adapted to mode 1, a charging voltage starts to be applied to a charging plug. On the other hand, when a charging connector of a charging station adapted to modes 2, 3 is connected to a vehicle-side charging inlet, communication is started, and a charging voltage starts to be applied when charging preparation is confirmed.

It is likely that various types of electric vehicles and plug-in vehicles will come along. It may therefore be necessary for a charging station to be adapted to both mode 1 and modes 2, 3.

When a vehicle adapted to modes 2, 3 is charged by a charging station adapted to both mode 1 and modes 2, 3, the vehicle may erroneously detect a failure of the charging station depending on timing of pressing the start button of the charging station.

It is preferable that the vehicle adapted to modes 2, 3 determine presence or absence of welding of a relay of the charging station, and that charging not be performed if welding of the relay has occurred. For this reason, the charging station adapted to modes 2, 3 sets the relay of the charging station to an OFF state when the connector is connected to the vehicle. Then, if the vehicle confirms that a charging voltage is not being applied with the connector being connected to the vehicle, the vehicle determines that the relay of the charging station has not been welded.

In such case, however, with the charging station adapted to both mode 1 and modes 2, 3, if the connector is connected immediately after the start button is pressed, a voltage remains on the connector, and the vehicle may erroneously determine that the relay of the charging station has been welded.

While a determination may be made after waiting for some time, it will take time before charging starts. In addition, since multiple manufacturers make charging stations, with or without a discharging resistor and with various resistance values of the discharging resistor, and with different manners in which a voltage is reduced, setting a uniform waiting time is difficult.

An object of the present invention is to provide a charging control apparatus capable of correctly determining presence or absence of a failure of a charging station.

Means for Solving the Problems

To summarize, the present invention is directed to a charging control apparatus mounted on a vehicle connected to an external charging device through a charging connector, for performing control related to charging, including a voltage detection unit for detecting a voltage applied to the charging connector, and an abnormality determination unit for estimating, based on variation in voltage detected by the voltage detection unit during a predetermined period of time after the charging connector is connected to the vehicle, variation in voltage applied to the charging connector after a lapse of the predetermined period of time, and determining that a failure has occurred in the external charging device if a degree of separation between the variation in voltage detected by the voltage detection unit after the lapse of the predetermined period of time and the estimated variation in voltage is larger than a predetermined value.

Preferably, the external charging device includes a relay for switching between application and interruption of a charging voltage to the charging connector, and a discharging device provided closer to the charging connector than the relay, for discharging residual charge of the charging connector. The failure determined by the abnormality determination unit includes a failure of the relay.

More preferably, the discharging device includes a discharging resistor. The abnormality determination unit obtains a plurality of detected voltages from the voltage detection unit at a plurality of different points in time during the predetermined period of time, estimates a discharge curve by the discharging resistor based on the plurality of detected voltages, and determines that a failure has occurred in the relay if a value indicating a degree of separation between a detected voltage obtained by the voltage detection unit after a lapse of the predetermined period of time and its corresponding voltage on the discharge curve is larger than a threshold value.

Still more preferably, the external charging device is adapted to a first charging mode in which a voltage is applied to the charging connector in response to an instruction to start charging from an operator, and a second charging mode in which a voltage is applied to the charging connector when the external charging device conducts communication with the vehicle and a communication result satisfies a predetermined condition. In the second charging mode, the external charging device starts the communication after the relay is disconnected.

Still more preferably, the vehicle is adapted to the second charging mode, and the abnormality determination unit determines presence or absence of a failure of the relay based on the voltage of the charging connector before the communication is started.

Another aspect of the present invention is directed to a vehicle including any of the charging control apparatuses described above.

Effects of the Invention

According to the present invention, presence or absence of a failure of a charging station can be correctly determined, thereby reducing the number of cases where charging is prohibited due to erroneous determination.

MODES FOR CARRYING OUT THE INVENTION

Figure 1:
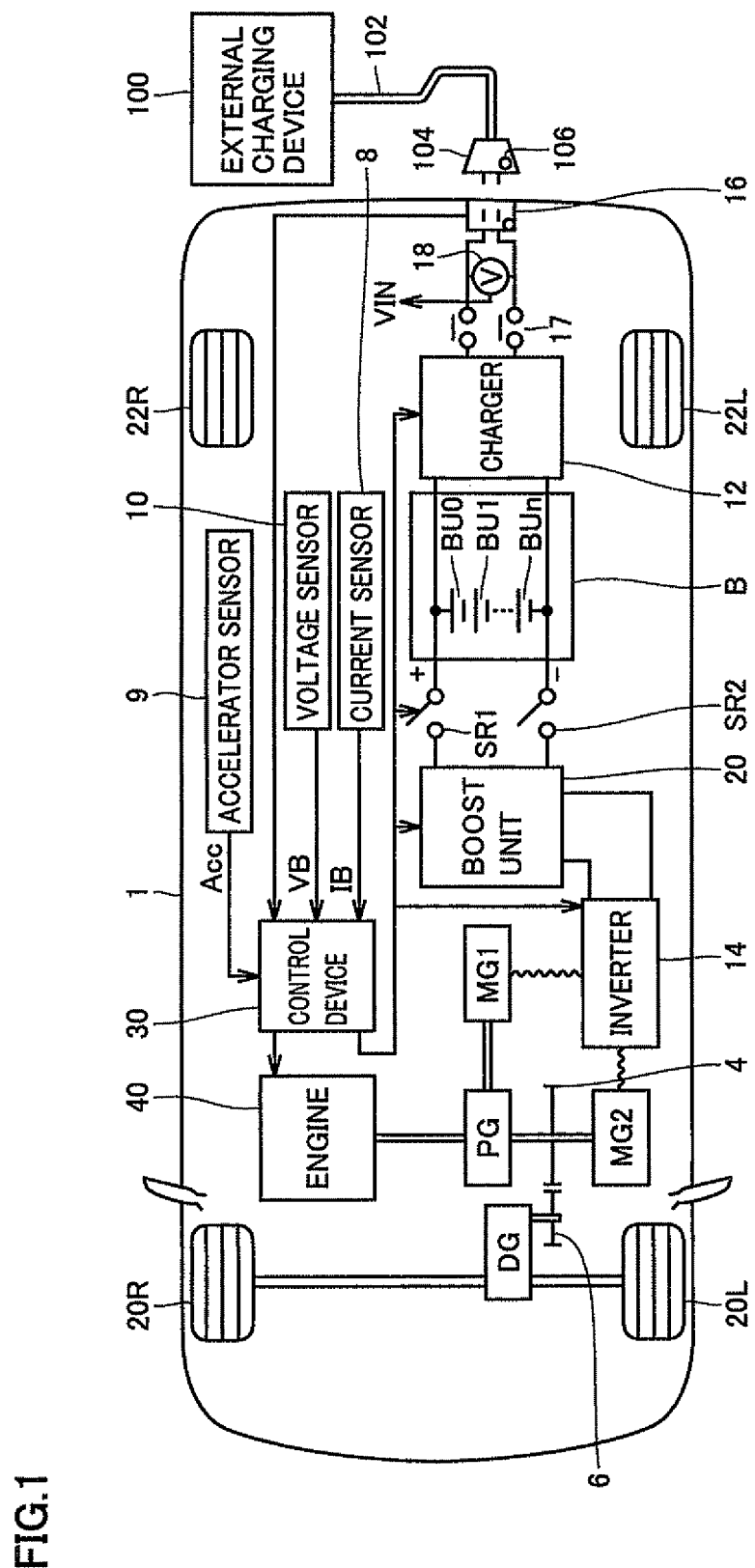
FIG. 1 is a block diagram showing a structure of a hybrid vehicle 1 according to an embodiment of the present invention.

Embodiments of the present invention will be described hereinafter in detail with reference to the drawings. It is noted that the same or corresponding parts have the same reference signs allotted in the drawings, and description thereof will not be repeated.

FIG. 1 is a block diagram showing a structure of a hybrid vehicle 1 according to an embodiment of the present invention.

Referring to FIG. 1, hybrid vehicle 1 includes front wheels 20R, 20L, rear wheels 22R, 22L, an engine 40, a planetary gear PG, a differential gear DG, and gears 4, 6.

Hybrid vehicle 1 also includes a battery B, a boost unit 20 for boosting DC electric power output from battery B, and an inverter 14 for supplying and receiving DC electric power to and from boost unit 20.

Hybrid vehicle 1 further includes a motor generator MG1 for generating electric power with mechanical power received from engine 40 through planetary gear PG, and a motor generator MG2 having a rotation shaft connected to planetary gear PG. Inverter 14 is connected to motor generators MG1 and MG2, and performs conversion between alternating current (AC) electric power and DC electric power from a boost circuit.

Planetary gear PG includes a sun gear, a ring gear, a pinion gear that engages with both the sun gear and the ring gear, and a planetary carrier that supports the pinion gear around the sun gear in a rotatable manner. Planetary gear PG has first to third rotation shafts. The first rotation shaft is a rotation shaft of the planetary carrier connected to engine 40. The second rotation shaft is a rotation shaft of the sun gear connected to motor generator MG1. The third rotation shaft is a rotation shaft of the ring gear connected to motor generator MG2.

Gear 4 is attached to the third rotation shaft, and gear 4 drives gear 6 to transmit mechanical power to differential gear DG. Differential gear DG transmits the mechanical power received from gear 6 to front wheels 20R, 20L, and transmits torque of front wheels 20R, 20L to the third rotation shaft of planetary gear PG through gears 6, 4.

Planetary gear PG serves to split mechanical power among engine 40 and motor generators MG1, MG2 (serves as a power split device). Namely, planetary gear PG determines rotation of one of the three rotation shafts in accordance with rotations of the other two rotation shafts. Accordingly, a vehicle speed is controlled by controlling an amount of electric power generated by motor generator MG1 and driving motor generator MG2 while operating engine 40 in the most efficient area, thereby implementing an energy-efficient vehicle as a whole.

Battery B which is a DC power supply includes a nickel-metal hydride secondary battery, a lithium-ion secondary battery or the like, for example. Battery B supplies DC electric power to boost unit 20, and is charged with DC electric power from boost unit 20.

Boost unit 20 boosts a DC voltage received from battery B, and supplies the boosted DC voltage to inverter 14. Inverter 14 converts the supplied DC voltage to an AC voltage, and controls drive of motor generator MG1 during engine starting. After the engine is started, AC electric power generated by motor generator MG1 is converted by inverter 14 to DC electric power and converted by boost unit 20 to a voltage suitable for charging battery B, thus charging battery B.

In addition, inverter 14 drives motor generator MG2. Motor generator MG2 assists engine 40 to drive front wheels 20R, 20L. During braking, motor generator MG2 performs regenerative operation, and converts rotative energy of the wheels to electric energy. The electric energy thus obtained is returned to battery B through inverter 14 and boost unit 20.

Battery B is an assembled battery, and includes a plurality of series-connected battery units BU0 to BUn. System relays SR1, SR2 are provided between boost unit 20 and battery B, and a high voltage is interrupted when the vehicle is not being operated.

Hybrid vehicle 1 further includes an accelerator sensor 9 which is an input unit for receiving an acceleration request instruction from a driver and senses an accelerator pedal position, a current sensor 8 for detecting a current of battery B, a voltage sensor 10 for detecting a voltage of battery B, and a control device 30 for controlling engine 40, inverter 14 and boost unit 20 in accordance with an accelerator pedal position Acc from accelerator sensor 9, a current IB from current sensor 8, and a voltage VB from voltage sensor 10. Current sensor 8 and voltage sensor 10 sense current IB and voltage VB of battery B, and transmit them to control device 30, respectively.

Hybrid vehicle 1 further includes an inlet 16 to be connected to a connector 104 that is provided at a tip of a charging cable 102 extending from an external charging device 100, and a charger 12 for receiving AC electric power from external charging device 100 through inlet 16. Charger 12 is connected to battery B, and supplies DC electric power for charging to battery B.

Control device 30 recognizes that connector 104 has been connected to inlet 16 by detecting a coupling confirmation element 106 of connector 104.

Coupling confirmation element 106 may be in any form, such as a resistor or a magnet incorporated on the plug side. Alternatively, a push-button type switch which is depressed during plug insertion may be provided on the inlet 16 side.

Hybrid vehicle 1 further includes a voltage sensor 18 for detecting a voltage VIN applied to inlet 16, and a relay 17 for switching between conduction/non-conduction of an electrical connection path between inlet 16 and charger 12.

Control device 30 receives input of detected values for current and voltage from current sensor 8 and voltage sensor 10 that are provided for battery B, and calculates a state quantity indicating a state of charge (hereinafter also referred to as "SOC") of battery B.

Then, based on this information, control device 30 controls charger 12 and relay 17 for charging battery B.

Figure 2:
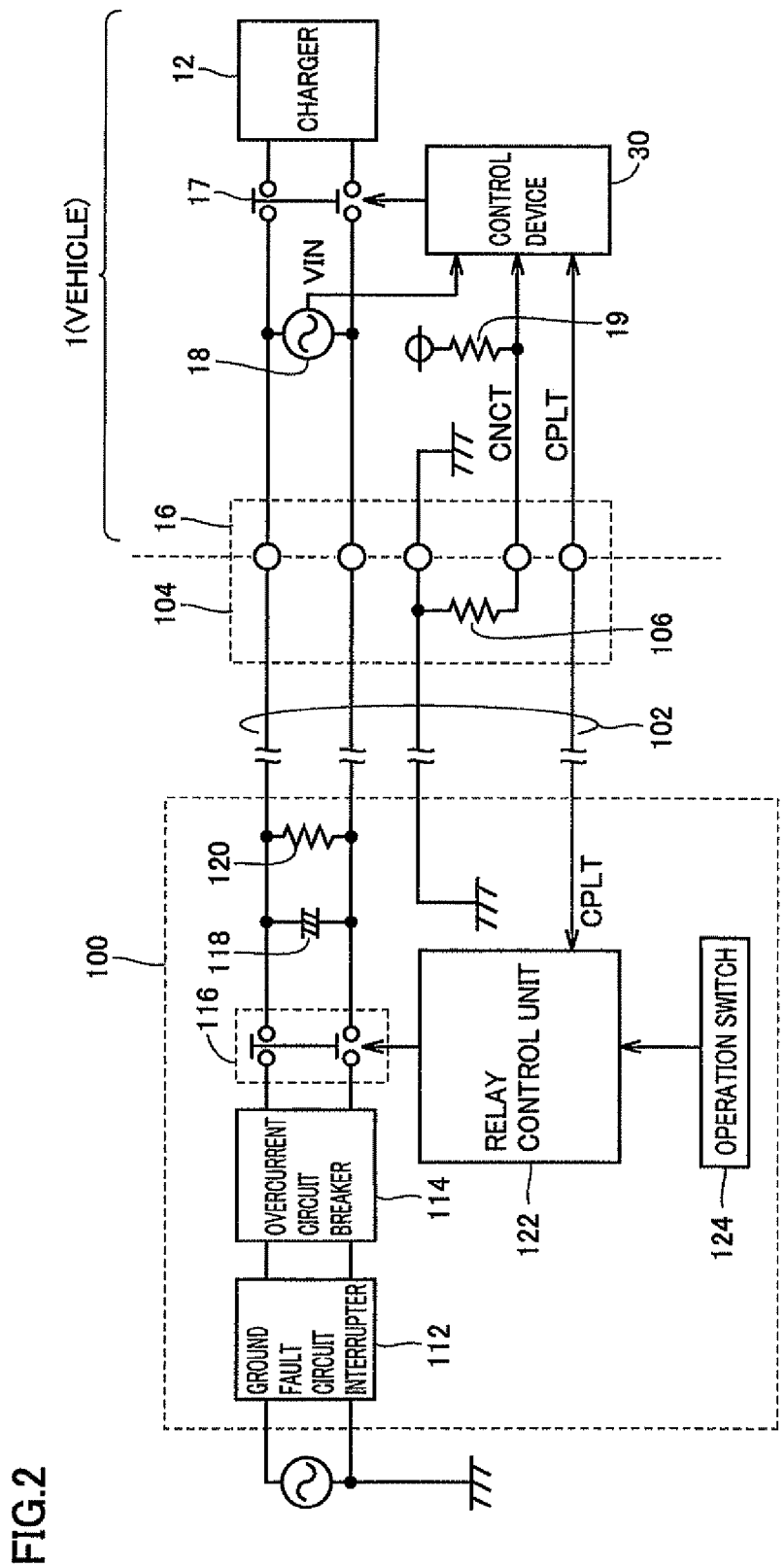
FIG. 2 is a circuit diagram showing a structure of an external charging device 100 in FIG. 1.

FIG. 2 is a circuit diagram showing a structure of external charging device 100 in FIG. 1.

Referring to FIG. 2, control device 30 provided in vehicle 1 includes a CPU (Central Processing Unit), a memory and an input/output buffer, although these are not shown, performs input of signals from the sensors and the like and output of control instructions to the devices, and controls vehicle 1 and the devices. Such control is not limited to software processing, but may processed by constructing dedicated hardware (electronic circuit).

Control device 30 receives a cable connection signal CNCT and a pilot signal CPLT from charging cable 102 through vehicle inlet 16. Control device 30 also receives a detected value for voltage VIN of receiving power from voltage sensor 18.

Charging cable 102 has one end connected to external charging device 100, and the other end provided with connector 104 to be connected to vehicle inlet 16. Charging cable 102 includes a pair of electric power lines for transmitting charging electric power to the battery of the vehicle, a ground wire, and a signal line for transmitting and receiving pilot signal CPLT.

External charging device 100 includes a discharging resistor 120 for discharging residual charge of the pair of electric power lines, a smoothing capacitor 118 connected across the pair of electric power lines, a relay 116, an overcurrent circuit breaker 114, a ground fault circuit interrupter 112, a relay control unit 122, and an operation switch 124.

Ground fault circuit interrupter 112, overcurrent circuit breaker 114, and relay 116 are provided in series on a path that connects an external power supply to the pair of electric power lines. When one of ground fault circuit interrupter 112, overcurrent circuit breaker 114, and relay 116 is opened, electric power from the external power supply is electrically interrupted from connector 104.

Opening/closing of relay 116 is controlled based on an instruction from relay control unit 122. The relay control unit outputs an instruction to open/close relay 116 in accordance with one of pilot signal CPLT and operation switch 124.

Coupling confirmation element 106 for sensing connection of charging connector 104 is provided within charging connector 104. The level of signal CNCT varies depending on a connection state between vehicle inlet 16 and charging connector 104.

When vehicle inlet 16 and charging connector 104 are not connected to each other, signal CNCT is set to a power supply potential by a pull-up resistor 19. When vehicle inlet 16 and charging connector 104 are connected to each other, signal CNCT is set to a potential divided with pull-up resistor 19 and coupling confirmation element 106 (resistor). Control device 30 determines whether or not charging connector 104 has been connected to vehicle inlet 16 based on the variation in level of signal CNCT.

Relay control unit 122 outputs pilot signal CPLT to control device 30 through charging connector 104 and vehicle inlet 16. Pilot signal CPLT is a signal for external charging device 100 to notify control device 30 of a rated current of charging cable 102. Pilot signal CPLT is also used as a signal for remotely controlling relay 116 by control device 30, based on a potential of pilot signal CPLT that is controlled by control device 30. Relay control unit 122 controls relay 116 based on variation in potential of pilot signal CPLT. That is, pilot signal CPLT is supplied and received between control device 30 and relay control unit 122.

Figure 3:
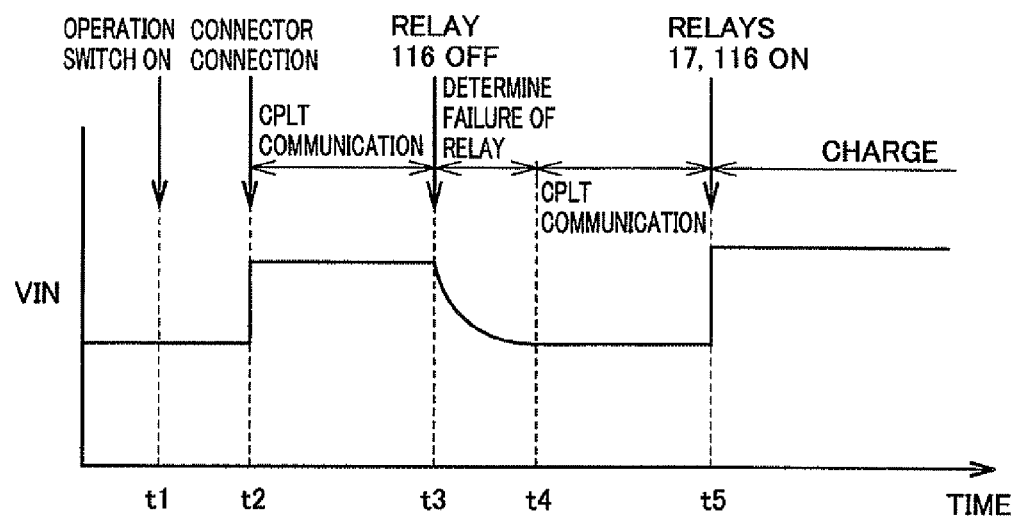
FIG. 3 is a waveform diagram showing an example of variation in voltage VIN until charging operation is started.

FIG. 3 is a waveform diagram showing an example of variation in voltage VIN until charging operation is started.

Referring to FIGS. 2 and 3, first, an operator turns the operation switch of external charging device 100 on at time t1, and performs operation of connecting the connector to the vehicle at time t2.

At this point in time, external charging device 100 cannot determine whether the connected vehicle is adapted to mode 1, or the vehicle is adapted to mode 3. Although depending on the specifications of external charging device 100 as well, a voltage may be applied to the connector simultaneously with the turn-on of operation switch 124.

When connector 104 is connected to inlet 16 at time t2, voltage sensor 18 detects voltage VIN, and so the waveform in FIG. 3 rises at time t2.

During a period between times t2 and t3, communication with pilot signal CPLT is conducted. As a result, at time t3, control device 30 of the vehicle provides an instruction to turn relay 116 off to relay control unit 122. Consequently, during a period between times t3 and t4, residual charge accumulated in capacitor 118 is discharged by discharging resistor 120.

During this period between times t3 and t4, control device 30 on the vehicle side determines whether or not relay 116 of external charging device 100 has been welded. A value of discharging resistor 120 and a capacity value of capacitor 118 depend on the manufacturer of external charging device 100, however. Thus, a discharge curve during the period between times t3 and t4 is not uniform.

For this reason, control device 30 estimates a discharge curve of values of voltage VIN based on a plurality of initial sampled values, and determines whether or not relay 116 has been normally disconnected based on whether or not subsequent sampled values of voltage VIN change along the estimated discharge curve.

If it is determined that relay 116 is normal (that welding has not occurred), communication with pilot signal CPLT is conducted during a period between times t4 and t5. As a result, at time t5, relay 17 and relay 116 are set to be turned on and voltage VIN is reapplied, thus starting charging of battery B.

Figure 4:
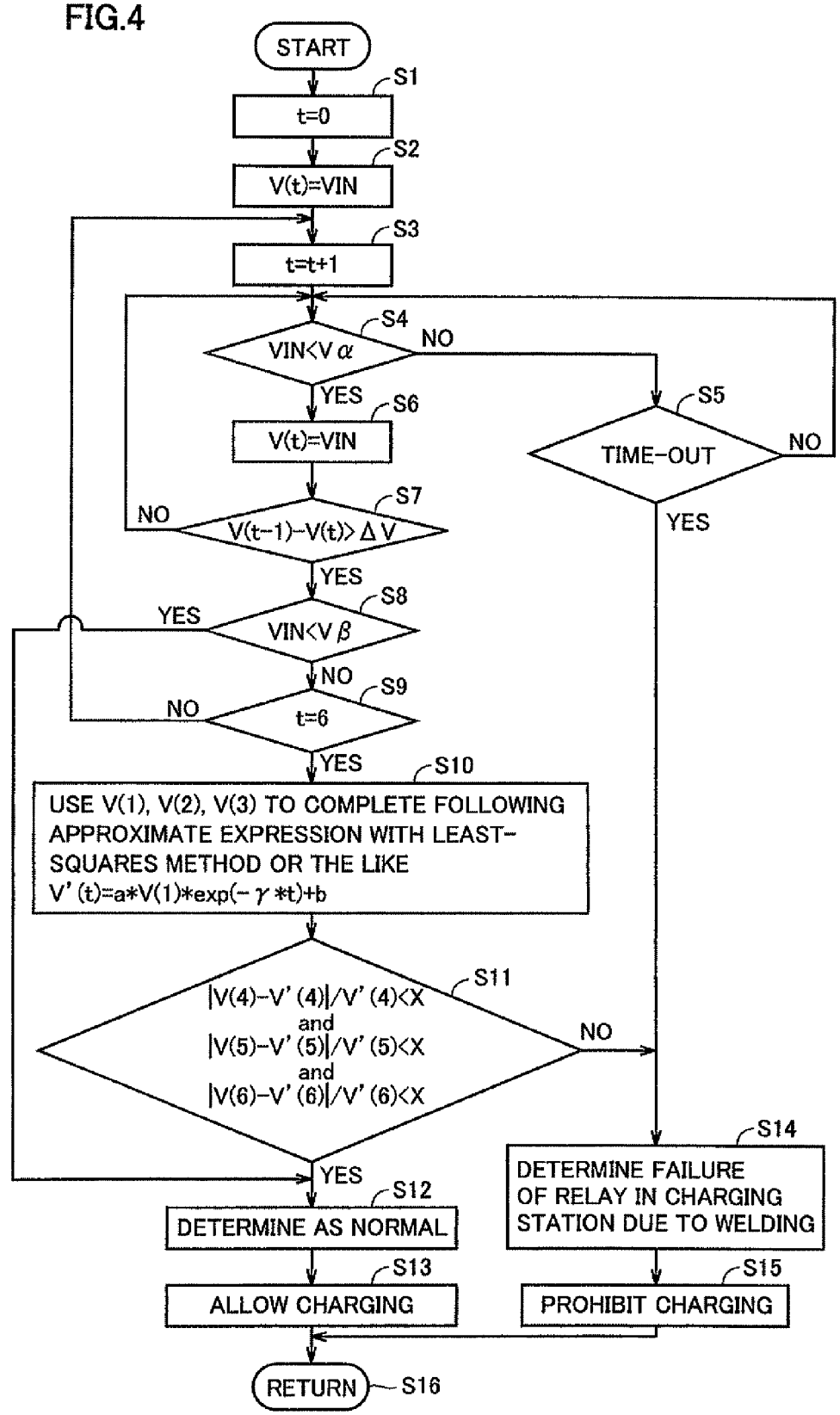
FIG. 4 is a flowchart for explaining operation of determining presence or absence of welding of a relay 116, which is performed by a control device 30.

FIG. 4 is a flowchart for explaining the operation of determining presence or absence of welding of relay 116, which is performed by control device 30. The processing of this flowchart is called from a predetermined main routine. After the process of transmitting the instruction to disconnect relay 116 from control device 30 to relay control unit 122 through pilot signal CPLT is performed in the main routine, the processing of this flowchart is performed.

Figure 5:
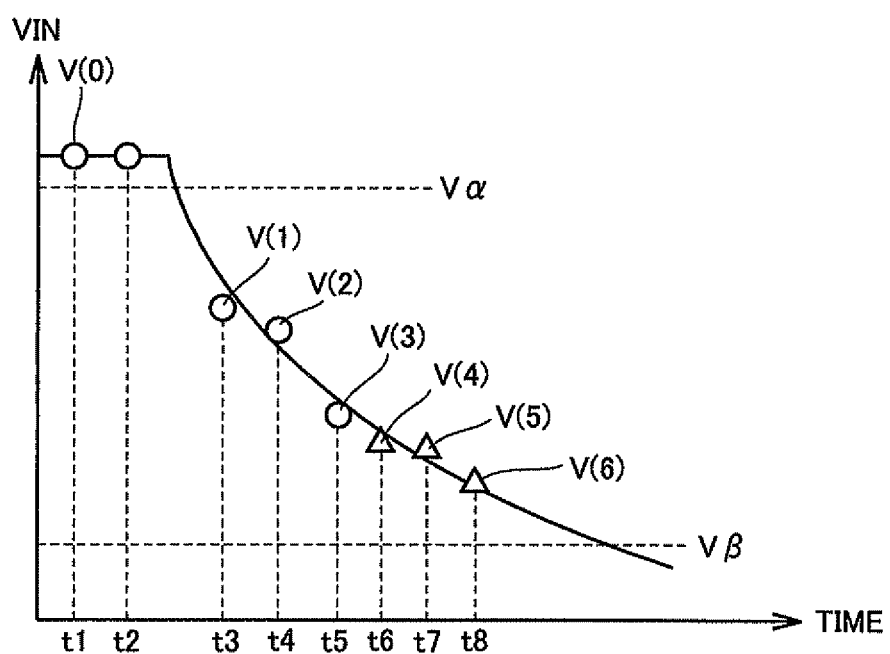
FIG. 5 illustrates an example of a discharge curve of voltage VW.

FIG. 5 illustrates an example of a discharge curve of voltage VIN.

Referring to FIGS. 4 and 5, when the processing is started, a variable t is set to zero in step S1. Then, in step S2, a value of voltage VIN at this time is set as data V(t). Since t=0 is satisfied, VIN is stored as V(0). A value of voltage VIN that is initially sampled at time t1 in FIG. 5 is V(0).

Then, in step S3, variable t is incremented. Further, in step S4, it is determined whether or not the value of voltage VIN is smaller than a threshold value Vα. If the value of voltage VIN is smaller than threshold value Vα, the processing proceeds to step S6. On the other hand, if the value of voltage VIN is not smaller than threshold value Vα, the processing proceeds to step S5. In step S5, it is determined whether or not a predetermined time-out period has elapsed. If the time-out period has not elapsed in step S5, the process of step S4 is performed again. On the other hand, if the time-out period has elapsed in step S5, the processing proceeds to step S14.

At time t2 in FIG. 5, the value of voltage VIN is not yet smaller than threshold value Vα, and thus not stored as data. On the other hand, if the processing proceeds from step S4 to step S6, the value of voltage VIN at this time is stored as data V(t). At time t3 in FIG. 5, the value of voltage VIN is smaller than threshold value Vα, and thus stored as data V(1).

Then, in step S7, it is determined whether or not the variation in value of voltage VIN is reduction. Specifically, it is determined whether or not V(t−1)−V(t) is larger than a threshold value ΔV. If V(t−1)−V(t)>ΔV is not satisfied in step S7, the processes of steps S4 and S6 are performed again, and V(t) stored once is rewritten as a newly sampled value.

If V(t−1)−V(t)>ΔV is satisfied in step S7, the processing proceeds to step S8. In step S8, it is determined whether or not the value of voltage VIN is smaller than a threshold value Vβ. As shown in FIG. 5, threshold value Vβ is smaller than threshold value Vα, and close to zero.

If VIN<Vβ is satisfied in step S8, the processing proceeds to step S12. This is when relay 116 has been normally disconnected and voltage VIN has decreased sufficiently. On the other hand, if VIN<Vβ is not satisfied in step S8, the processing proceeds to step S9. In step S9, it is determined whether or not t=6 is satisfied, namely, whether or not sampled data V(1) to V(6) on the value of voltage VIN has been obtained.

If variable t has not reached 6 in step S9, the processes of step S3 and its subsequent steps are repeated. On the other hand, if variable t has reached 6 in step S9, the processing proceeds to step S10.

In step S10, three pieces of data V(1), V(2), V(3) are used to complete the following approximate expression with a least-squares method. It is noted that a, γ, b represent constants, and exp( ) represents an exponential function of the base of natural logarithm e.

$$V'(t)=a*V(1)*\exp(-\gamma*t)+b \tag{1}$$

Then, in step S11, it is determined whether or not data V(4), V(5), V(6) changes along the approximate expression (1). When making the determination, for example, the data can be determined to change along the approximate expression if the following expression (2) is satisfied for all cases where t=4, 5, 6 is satisfied. It is noted that X represents a criterion value.

$$|V(t)-V'(t)|/V'(t)<X \tag{2}$$

Other than the expression (2), a variety of methods for determining a degree of separation between the approximate expression and the obtained data can be used. For example, the difference between the approximate expression and the obtained data can simply be compared to the criterion value.

If the expression (2) is satisfied for all cases where t=4, 5, 6 is satisfied in step S11, the processing proceeds to step S12, and if the expression (2) is not satisfied for any of the cases where t=4, 5, 6 is satisfied, the processing proceeds to step S14.

In step S12, it is determined that relay 116 is normal (not welded), and charging is allowed in step S13. On the other hand, in step S14, it is determined that relay 116 is abnormal (welded), and charging is prohibited in step S15.

When the process of step S13 or step S15 is completed, the processing is returned to the main routine in step S16.

While six values of voltage VIN are sampled for determination in the flowchart of FIG. 4, the number of samplings may be increased or reduced. Further, while the approximate expression (1) is completed based on the three pieces of data, the approximate expression (1) may be completed using more pieces of data.

Lastly, the present embodiment is summarized with reference to the drawings again. Referring to FIGS. 1 and 2, the charging control apparatus according to the present embodiment is mounted on vehicle 1 connected to external charging device 100 through charging connector 104, for performing control related to charging. The charging control apparatus includes voltage sensor 18 for detecting a voltage applied to charging connector 104, and control device 30 for estimating, based on variation in voltage detected by voltage sensor 18 during a predetermined period of time after charging connector 104 is connected to the vehicle, variation in voltage applied to charging connector 104 after a lapse of the predetermined period of time, and determining that a failure has occurred in the external charging device if a degree of separation between the variation in voltage detected by voltage sensor 18 after the lapse of the predetermined period of time and the estimated variation in voltage is larger than a predetermined value.

Preferably, the external charging device includes relay 116 for switching between application and interruption of a charging voltage to charging connector 104, and the discharging device (discharging resistor 120) provided closer to the charging connector than relay 116, for discharging residual charge of charging connector 104 (residual discharge of capacitor 118). The failure determined by control device 30 includes a failure of relay 116.

More preferably, the discharging device includes discharging resistor 120. Control device 30 obtains a plurality of detected voltages (e.g., V(1), V(2), V(3) in FIG. 5) from voltage sensor 18 at a plurality of different points in time (e.g., times t3, t4, t5 in FIG. 5) during the predetermined period of time, estimates a discharge curve by discharging resistor 120 based on the plurality of detected voltages, and determines that a failure has occurred in relay 116 if a value indicating a degree of separation between a detected voltage (e.g., V(4), V(5), V(6) in FIG. 5) obtained by the voltage detection unit after a lapse of the predetermined period of time and its corresponding voltage on the discharge curve is larger than a threshold value (NO in step S11 in FIG. 4).

Still more preferably, external charging device 100 is adapted to a first charging mode (mode 1 established by the JEVS) in which a voltage is applied to charging connector 104 in response to an instruction to start charging from an operator (operation switch ON), and a second charging mode (mode 2 or 3 established by the JENS) in which a voltage is applied to charging connector 104 when external charging device 100 conducts communication with vehicle 1 and a communication result satisfies a predetermined condition. In the second charging mode, external charging device 100 starts the communication after relay 116 is disconnected.

Still more preferably, vehicle 1 is adapted to the second charging mode. As shown in FIG. 3, control device 30 determines presence or absence of a failure of relay 116 based on the voltage of charging connector 104 during the period between times t3 and t4, before the communication during the period between times t4 and t5 is started.

As described above, when a plug-in hybrid vehicle or an electric vehicle is charged by a charging station, in the present embodiment, voltages are successively detected after a lapse of a predetermined period of time after connection of a charging connector, and if the voltages obtained later are asymptotic to an approximate expression that is obtained from the voltages obtained earlier, it is determined that welding of a relay has not occurred. As a result, even if the charging connector is connected to the vehicle due to operation by an operator with a high voltage remaining on the connector, the vehicle can be prevented from erroneously determining a failure of the charging station.

It should be understood that the embodiments disclosed herein are illustrative and non-restrictive in every respect. The scope of the present invention is defined by the terms of the claims, rather than the description above, and is intended to include any modifications within the scope and meaning equivalent to the terms of the claims.

DESCRIPTION OF THE REFERENCE SIGNS 1 hybrid vehicle; 4, 6 gear; 8 current sensor; 9 accelerator sensor; 10, 18 voltage sensor; 12 charger; 14 inverter; 16 vehicle inlet; 17, 116 relay; 19 pull-up resistor; 20 boost unit; 20R, 20L front wheel; 22R, 22L rear wheel; 30 control device; 40 engine; 100 external charging device; 102 charging cable; 104 charging connector; 106 coupling confirmation element; 112 ground fault circuit interrupter; 114 overcurrent circuit breaker; 118 capacitor; 120 discharging resistor; 122 relay control unit; 124 operation switch; B battery; BU0 to BUn battery unit; DG differential gear; MG1, MG2 motor generator; PG planetary gear; SR1, SR2 system relay.

The invention claimed is:

1. A charging control apparatus mounted on a vehicle connected to an external charging device through a charging connector, for performing control related to charging, comprising:
a voltage detection unit for detecting a charging voltage applied to said charging connector; and
an abnormality determination unit for estimating, based on variation in voltage detected by said voltage detection unit during a predetermined period of time after said charging connector is connected to said vehicle, variation in the charging voltage applied to said charging connector after a lapse of said predetermined period of time, and determining that a failure has occurred in said external charging device if a degree of separation between the variation in voltage detected by said voltage detection unit after the lapse of said predetermined period of time and the estimated variation in voltage is larger than a predetermined value.

2. The charging control apparatus according to claim 1, wherein
said external charging device includes
a relay for switching between application and interruption of the charging voltage to said charging connector, and
a discharging device provided closer to said charging connector than said relay, for discharging residual charge of said charging connector, and
the failure determined by said abnormality determination unit includes a failure of said relay.

3. The charging control apparatus according to claim 2, wherein
said discharging device includes a discharging resistor, and
said abnormality determination unit obtains a plurality of detected voltages from said voltage detection unit at a plurality of different points in time during said predetermined period of time, estimates a discharge curve by said discharging resistor based on said plurality of detected voltages, and determines that a failure has occurred in said relay if a value indicating a degree of separation between a detected voltage obtained by said voltage detection unit after a lapse of said predetermined period of time and its corresponding voltage on said discharge curve is larger than a threshold value.

4. The charging control apparatus according to claim 3, wherein
said external charging device is adapted to a first charging mode in which a voltage is applied to said charging connector in response to an instruction to start charging from an operator, and a second charging mode in which a voltage is applied to said charging connector when said external charging device conducts communication with said vehicle and a communication result satisfies a predetermined condition, and
in said second charging mode, said external charging device starts said communication after said relay is disconnected.

5. The charging control apparatus according to claim 4, wherein
said vehicle is adapted to said second charging mode, and
said abnormality determination unit determines presence or absence of a failure of said relay based on the voltage of said charging connector before said communication is started.

6. A vehicle comprising the charging control apparatus according to claim 1.

7. A vehicle comprising the charging control apparatus according to claim 2.

8. A vehicle comprising the charging control apparatus according to claim 3.

9. A vehicle comprising the charging control apparatus according to claim 4.

10. A vehicle comprising the charging control apparatus according to claim 5.

* * * * *